United States Patent [19]

Caudill et al.

[11] 3,984,637
[45] Oct. 5, 1976

[54] COMPUTER TERMINAL SECURITY SYSTEM

[75] Inventors: Herman T. Caudill, Hyattsville, Md.; Edwin E. Euler, Springfield, Va.

[73] Assignee: The Singer Company, Binghamton, N.Y.

[22] Filed: Nov. 29, 1974

[21] Appl. No.: 528,092

[52] U.S. Cl. .................... 179/2 DP; 179/2 CA; 340/149 R; 340/172.5
[51] Int. Cl.² .................................. H04M 11/00
[58] Field of Search ............. 179/2 A, 2 DP, 2 CA, 179/1.5 R, 1.5 E, 2 R; 340/149 R, 149 A; 235/61.7 B; 445/22 (2), 22 (3), 22 (5), 46 (6), 46 (9); 178/22

[56] References Cited
UNITED STATES PATENTS

| | | | |
|---|---|---|---|
| 3,307,147 | 2/1967 | Goldman et al. | 340/150 |
| 3,516,062 | 6/1970 | Spraker | 179/2 DP |
| 3,647,972 | 3/1972 | Glover et al. | 179/2 CA |
| 3,665,162 | 5/1972 | Yamamoto et al. | 179/2 CA |
| 3,676,849 | 7/1972 | Malandro et al. | 340/149 R |
| 3,697,693 | 10/1972 | Deschenes et al. | 179/2 DP |
| 3,798,605 | 3/1974 | Feistel | 445/1 |
| 3,806,882 | 4/1974 | Clarke | 340/149 R |
| 3,852,571 | 12/1974 | Hall et al. | 340/149 A |

*Primary Examiner*—Kathleen H. Claffy
*Assistant Examiner*—Randall P. Myers
*Attorney, Agent, or Firm*—Ronald Reichman; James C. Kesterson

[57] ABSTRACT

This invention is a security system for computer terminals which system provides means for preventing the unauthorized access to digital computers from illicit terminals. The invention provides a local code unit which includes means for manually selecting a sequence of digits by means of a keyboard. When the selected sequence and the pre-set code in the local code unit are the same, the terminal equipment is connected to the transmission path. This prevents unauthorized personnel at an authorized terminal from gaining access to a transmission path. A second code, pre-set into the code transmitter by any suitable means such as switches, is transmitted over the transmission path to the code receiver. A code receiver at the other end of the transmission path connects the computer to the transmission path only when the second code is the same as the code pre-set into the code receiver.

10 Claims, 4 Drawing Figures

COMPUTER TERMINAL SECURITY SYSTEM

BACKGROUND OF THE INVENTION

1. Field of the Invention

This invention relates to remote-control terminals for computers and, more particularly, to security devices which prevent unauthorized access to a digital computer by an illicit terminal.

Remote terminals for providing access to digital computers over digital information transmission paths, usually telephone lines, have been used for many years. A telephone number or other central switching number is used to select the particular circuit connected to the computer. Although steps have been taken in the past to maintain such a telephone number secret, the numbers are often discovered, and unauthorized access to the computer becomes a reality. Such access permits the computer to be used by unauthorized persons, often at a great expense to the legitimate operator. In addition, such use by unauthorized individuals renders the computer vulnerable to damage, both deliberate and accidental. A third deleterious result is the availability to outsiders of proprietary programs which are stored in the computer. Obviously, a system is required to prevent such unauthorized access.

2. Description of the Prior Art

As mentioned above, in the prior art the primary means used for preventing unauthorized access to a computer by illicit terminals has been maintaining the transmission path exchange number of the computer a secret. One of the primary disadvantages of this system has been the fact that such numbers are readily available to a large number of persons and are usually under the control of the organization providing the transmisiion path, not under the control of the computer operator.

SUMMARY OF THE INVENTION

This invention provides a means for supplementing the prior art systems for preventing unauthorized access to digital computers.

It is an object of this invention to provide a new and improved security system.

It is another object of this invention to provide a new and improved security system for preventing unauthorized access to electronic equipment.

It is still another object of this invention to provide a new and improved system for preventing unauthorized access to digital computers.

It is yet another object of this invention to provide a new and improved system for preventing unauthorized access to electronic equipment, which system is under the control of the equipment operator.

Other objects and advantages of this invention will become more apparent as the following description proceeds, which description should be considered with the accompanying drawings.

DESCRIPTION OF A PREFERRED EMBODIMENT

Figure 1:
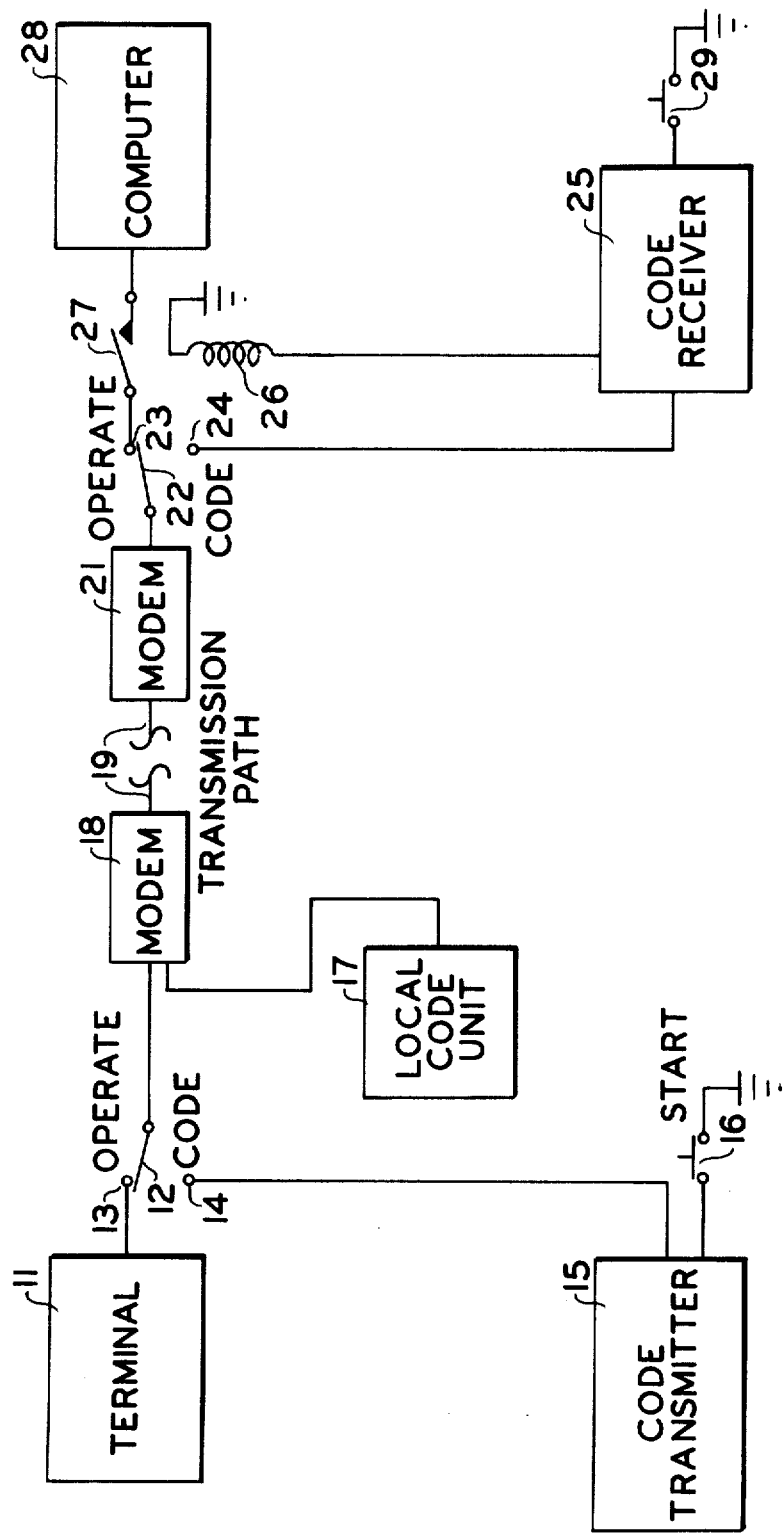
FIG. 1 is a block diagram of a communication system incorporating the apparatus of this invention.

Referring now to the drawings in detail and, more particularly, to FIG. 1, the reference character 11 designates a computer terminal which is connected by means of a switch 12 to a modem 18. The switch 12 includes one contact 13 which is connected to the output of the terminal 11 and a second contact 14 which is connected to the output of a code transmitter 15. The code transmitter 15 is grounded through a momentary-close switch 16. The movable contact of the switch 12 is connected to the input of modem 18 which is conditioned to transmit data by the local code unit 17. A modem is a device for connection to a telephone transmission line 19 or equivalent transmission path to couple a source of digital data to that transmission path. The modem is designed to match the impedance of the transmission path and to provide good two-way digital communication with that path. The transmission path 19 may be of any suitable length from several feet to several thousand miles and is connected at its other end to a second modem 21. The output of the modem 21 is connected to the movable contact 22 of a double-throw switch having stationary contacts 23 and 24. The contact 23 is connected through a relay switch 27 to the input of the computer 28, and the contact 24 is connected to the input of a code receiver 25. The output of the code receiver 25 is connected to ground through a coil 26 which operates the relay switch 27. The code receiver 25 is reset through a momentary-close switch 29.

In operation, the switch 12 is moved to the contact 13 to connect the terminal 11 to the modem 18. The local code unit 17 acts as a switch which is closed only when the proper code is applied to the local code unit. When the proper code is so applied to the unit 17 (this is explained in detail below), it connects the terminal 11 to the transmission path 19. The modem 21 at the other end of the transmission path 19 is connected through the switch 22 to either the code receiver 25 or the relay switch 27 by manually moving switch 22 to contact 24 or contact 23. In either case, the modem 21 is not connected to the input of the computer 28. In order to achieve the connection, the relay switch 27 must be closed. The switch 22 is manually placed in contact with the contact 24 to connect the code receiver 25 with the modem 21.

The switch 12 is then thrown so that it meets the contact 14 to connect the code transmitter 15 to the transmission path 19. A code is then generated by the operation of the code transmitter 15 and is transmitted through the modem 18, transmission path 19, the modem 21, and the switch 22 to the code receiver 25. If the code is the same as that which is stored in the code receiver 25, the coil 26 is engaged, and the relay switch 27 is closed. Moving the switch 12 and the switch 22 to their other positions connects the terminal 11 to the computer 28.

In the system of FIG. 1, if the code manually generated in the local code unit is not the correct code, the local unit 17 remains open-circuited and the terminal 11 is not connected to the transmission path 19. Even if the correct code is applied to the local unit 17, but an incorrect code is generated by the code transmitter 15, the relay switch 27 remains open and the computer 28 is not connected to the modem 21. Thus, the only way that the terminal 11 can be connected to the computer 28 is through the correct utilization of two different codes.

Figure 2:
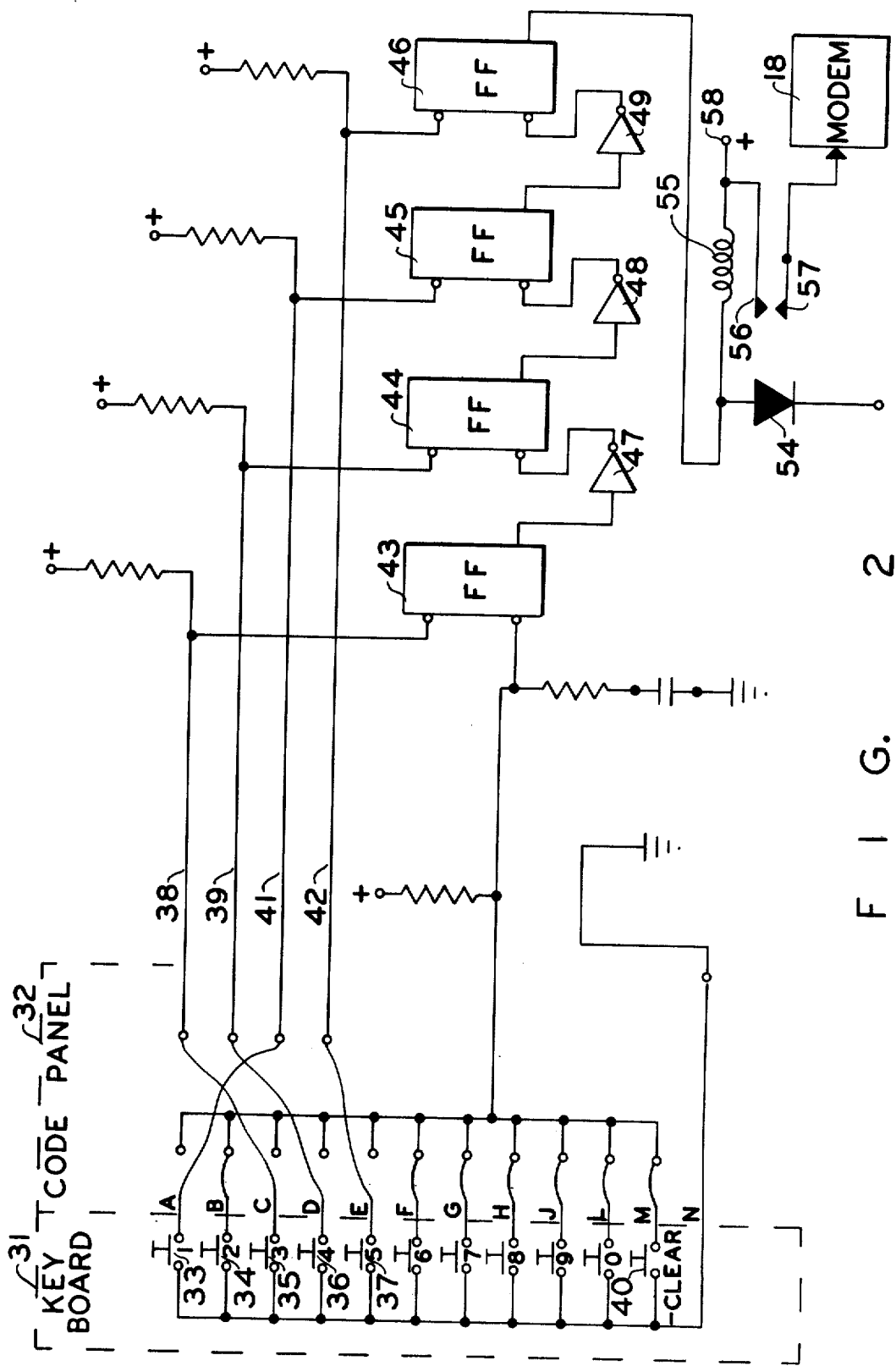
FIG. 2 is a block diagram of a local code unit suitable for use in the system of FIG. 1.

The local code unit is shown in block form in FIG. 2. The local unit 17 comprises a keyboard 31 which includes push-button keys 33, 34, 35, 36 and 37. Additional keys may be incorporated in the keyboard 31 but only some of those keys are utilized in any system at any time. The outputs of the individual switches 33–37 are connected through a code panel 32 to individual terminals over lines 38, 39, 41 and 42. The line 38 is connected to the set input of a flip-flop 43. The line 39 is connected to the set input of a flip-flop 44. The line 41 is connected to the set input of a flip-flop 45; the line 42 is connected to the set input of a flip-flop 46. The restore output from the flip-flop 43 is connected through an inverter 47 to the restore input of the flip-flop 44. The restore output from the flip-flop 44 is applied through an inverter 48 to the restore input of flip-flop 45; and the restore output of the flip-flop 45 is connected through an inverter 45 to the restore input of the flip-flop 46. The restore output of the flip-flop 46 is connected to a relay coil 55, and a pair of contacts 56 and 57 are operated by the coil 55 to connect a source of positive potential to condition the modem 18.

The keyboard 31 comprises a plurality of push-botton switches 33–37, each of which carries a numerical designation as shown. The switch 33 is designated as one; the switch 34 is designated as two; the switch 35 is designated as three; and so forth. One side of all of the push-button switches 33–37 are connected together and to a ground line, and the other side of each of the switches 33–37 is connected to an individual one of the lines 38–42. The connections from switches 33–37 to the lines 38–42 define a particular code. Thus, switch 33, which is the first switch, is connected to line 41, which is the third line. And switch 35, which is the third switch, is connected to the line 38, which is the first line. Switch 36 is connected to line 39, and switch 37 is connected to line 42. The particular code shown in FIG. 2 is 3415. The remainder of the switches on the keyboard 31 are connected to the restore input of the flip-flop 43.

The flip-flops 43–46 are set or restored by the application of "low" signals to their appropriate inputs. The set and the restore inputs of the flip-flops 43–46 are inverting inputs so that the application of a positive potential to either of these inputs does not affect the condition of the flip-flop. As shown in FIG. 2, the set inputs to each of the flip-flops 43–46 has a positive voltage applied to it. Depressing that particular switch 33–37 on the keyboard 31 which is connected to the set input of any of these flip-flops shorts that positive potential to ground and applies a negative-going pulse to that particular input. This sets the flip-flop. The restore input to the flip-flop 43 has a positive potential applied to it. When any of the switches on the keyboard 31 which are not connected to a set input are depressed, the restore input to the flip-flop 43 is grounded. This includes the clear switch 40. Thus, initially the flip-flop 43 is in its restored condition and produces a high output voltage which is applied to the inverter 47. The low output from the inverter 47 is applied to the restore input of the flip-flop 44, placing that flip-flop in its restored condition. The positive output from the flip-flop 44 is applied through an inverter 48 to restore the flip-flop 45, and the positive output from the flip-flop 46 prevents current from flowing through the relay coil 55, and the modem 18 is not conditioned to transmit data.

Should the code 3415 be inserted into the keyboard 31, the modem 18 is conditioned in the following manner. When the switch 35 (3) is depressed, the set input to the flip-flop 43 is grounded, driving that flip-flop into its set condition. This removes the positive potential from the restore output of the flip-flop 43 and unlocks the flip-flop 44. When the switch 36 (4) is closed momentarily, the set input to the flip-flop 44 is grounded and that flip-flop is driven into its set condition. This removes the positive potential from the restore output of the flip-flop 44 and unlocks flip-flop 45. When the switch 33 (1) is depressed, the set input of the flip-flop 45 is grounded, driving that input into its set condition. This unlocks the flip-flop 46, and, when the switch 37 (5) is depressed, the flip-flop 46 is set. The restore output from the flip-flop then goes low, permitting current to flow from the positive terminal 58, through the coil 55, to the flip-flop 46 output. The relay 56 closes under the influence of the energized coil 55, applying a positive potential from the terminal 58 to the modem 18 to condition that modem to transmit data.

Should the keyboard switches 31 be depressed in any order but 3415, the flip-flop 46 will not be set and the modem 18 will not be conditioned. Suppose, for example, that the switch 36 is depressed first. This grounds the set input to the flip-flop 44, but the output from the flip-flop 43 overrides that input, and the flip-flop 44 does not change its state. This will happen if the same numbers 3415 are depressed in different combinations. Suppose, however, that the first switch that is pressed is switch 34, which represents the number 2. This grounds the restore input to the flip-flop 43 insuring that the flip-flop remains in the restored state. This will happen whenever any switch other than the switches 33, 35, 36 and 37 are depressed. And, as shown, unless these four switches are depressed in the proper order, the four flip-flops 43–46 will not be set and the modem 18 will not be conditioned.

Once the modem 18 is enabled so that it can transmit data to the communication path 19, the relay switch 27 must be closed to connect the computer 28 to the same communications path. To accomplish this, the switch 12 is positioned against the contact 14, connecting the code transmitter 15 to the modem 18. The code transmitter 15 then transmits a suitable code which unlocks the receiver 25 to close the relay switch 27.

Figure 3:
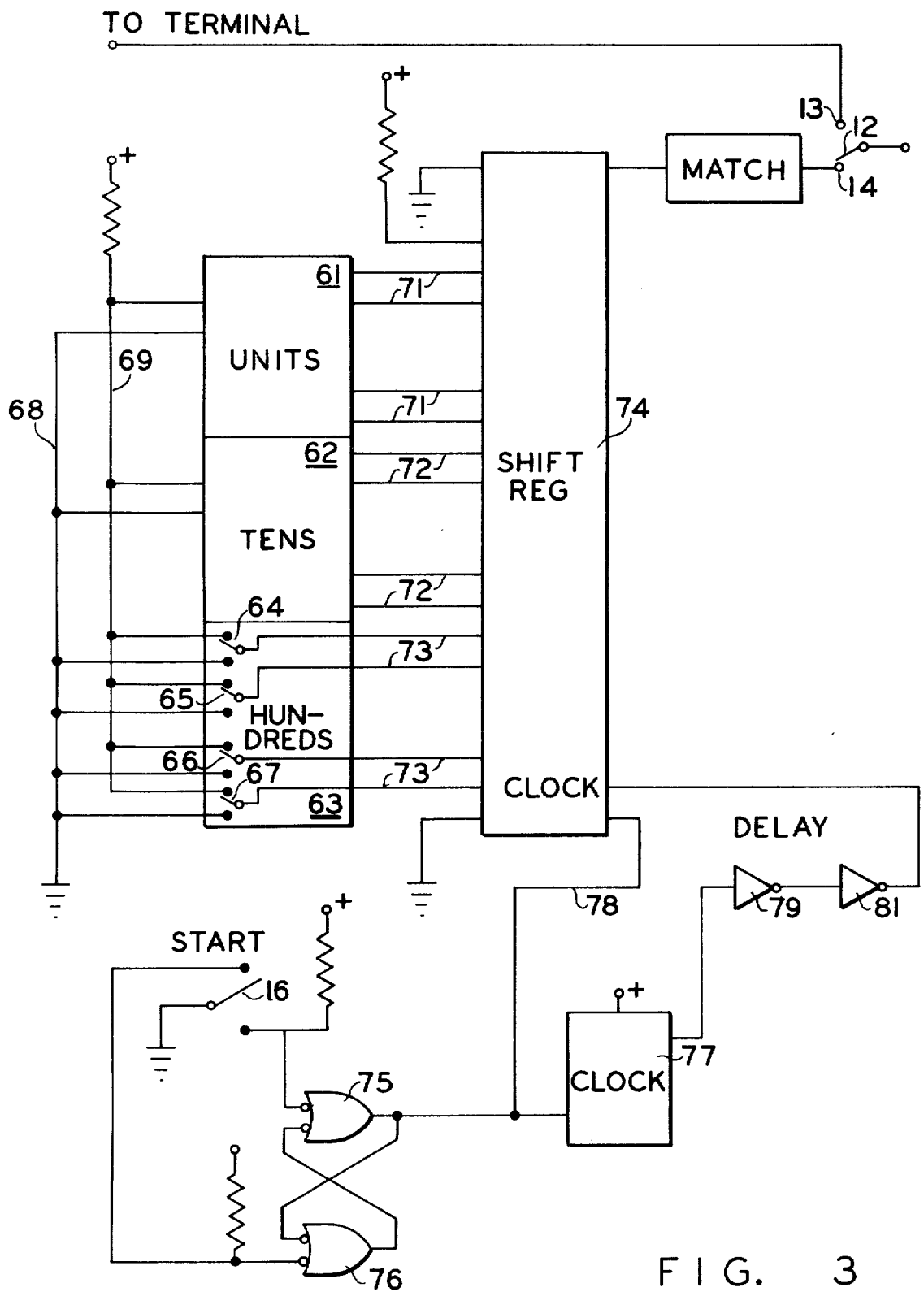
FIG. 3 is a block diagram of a code transmitter suitable for use in the system of FIG. 1.

The code transmitter 15 is shown in some detail in FIG. 3. The code transmitter 15 comprises a group of decade switches 61, 62, and 63, each of which comprises individual switches, for example, switches 64, 65, 66 and 67 in the decade 63. Each of the switches 64–67 is a double throw switch in which the movable contact is arranged to make a connection with either a line 69 carrying a positive voltage or a line 68 which is grounded. Each of the movable contacts of the switches in the decades 61–63 is connected to an input of a shift register 74. The shift register 74 has a plurality of digit positions, each of which has its own input from the decade switches 61–67. In addition, a clock generator has its output connected to the clock input of the shift register 74 through a delay formed of two inverters 79 and 81. A start circuit comprising two NOR gates 75 and 76 and the start switch 16 has an output connected to the load input of the shift register 74 and to the disable input of the clock generator 77. The output from the shift register 74 is applied through a line-matching circuit to the contact 14 of a double pole switch 12. The movable contact of the switch 12 is connected to the modem 18 and the local code unit 17 (see FIG. 1).

The code transmitter 15 generates a digital code which is transmitted through the modem 18 and the transmission path 19 to the code receiver 25. If the code transmitted by the transmitter 15 is the same as the code set into the code receiver 25, the relay switch 27 is closed to connect the computer 28 to the transmission path 19 through the modem 21. In operation, the code to be transmitted is set into the transmitter 15 by the setting of the individual switches 64–67. Each of the decades 61–63 contains several switches, in this example each decade contains four switches to provide a binary coded decimal value. As shown in FIG. 3, the decade 61 represents a unit value, decade 62 represents a tens value, and decade 63 represents a hundreds value, each of which values comprises four binary bits. The code is preset by closing the individual switches 64–67 to apply a positive voltage or ground to the line connected to the shift register 74. As shown, all of the switches 64–67 apply a positive voltage to the individual inputs of the register 74. When a switch 64–67 is in its top position, the positive voltage is applied, and, when the switch is in its lower position, the register 74 input is grounded. A positive voltage applied to an input means that when the information is coded into the register 74, a pulse is applied to that digit position. A ground input means that a zero is applied to that digit position.

The start switch 16 also has two positions, a start position and a load position. When the switch contact is in its upper position, one input to the gate 76 is grounded. This causes gate 76 to pass a high signal which is applied to the input of the gate 75. This causes gate 75 to generate a low output, applying another low input to the other input of the gate 76. A low signal is applied to the enable input of the clock generator 77 and to the load input of the register 74. When the input to the clock is low, the clock is disabled. When the input to the register 74 is low, the register is in the load mode. Moving the movable contact of the switch 16 to the lower position grounds one input to the gate 75. This produces a high output which is applied to one input of gate 76 and to the clock 77 and the register 74. The register 74 is placed into the shift mode, and the clock 77 is enabled. The gate 76 produces a low output which applies a low signal to the other input of the gate 75.

Figure 4:
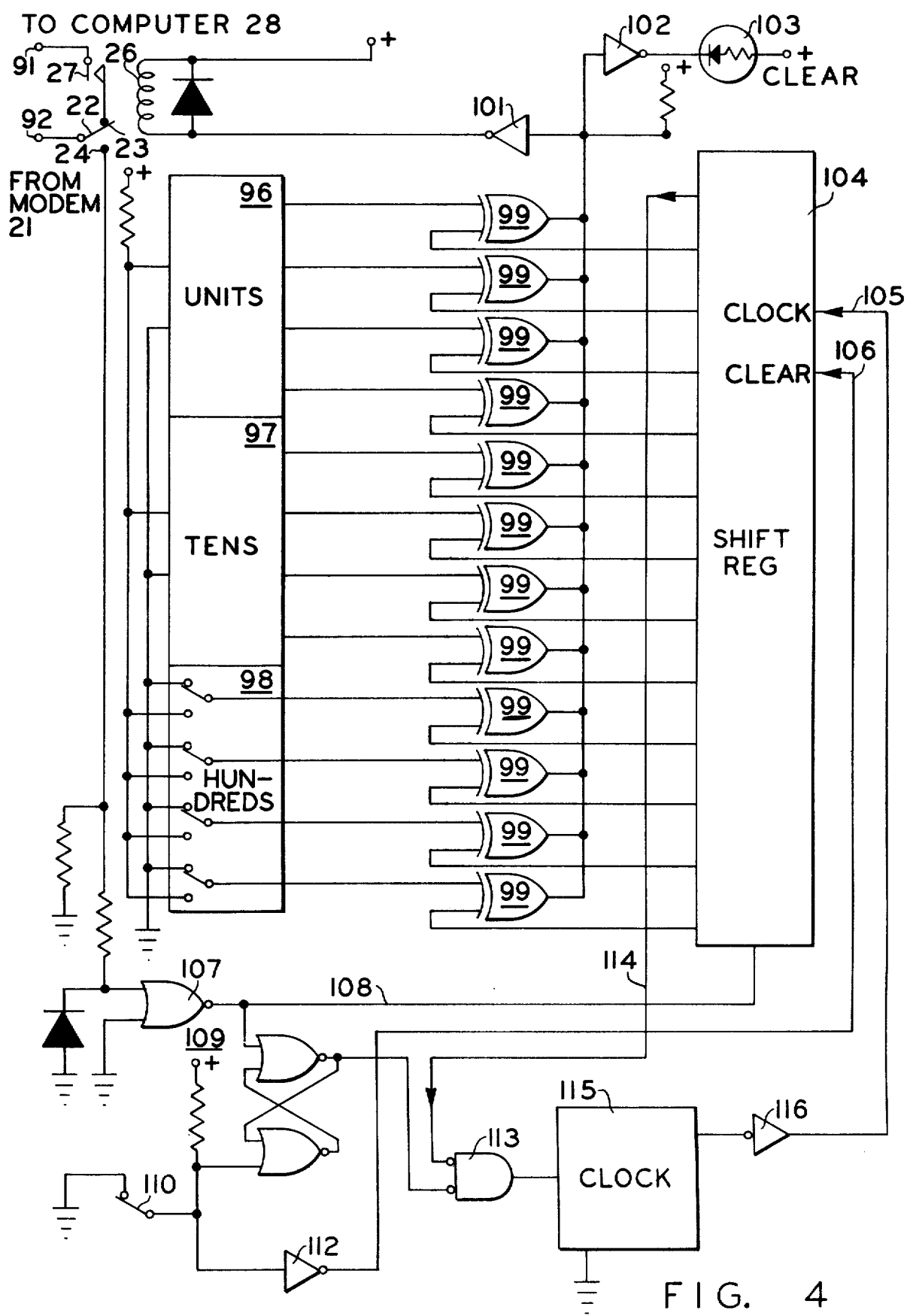
FIG. 4 is a block diagram of a code receiver suitable for use in the system of FIG. 1.

During the time that the register 74 was in the load mode, the information generated by the positions of the switches in the decades 61–63 was transferred to the shift register 74. When the register 74 was placed in the shift mode and the clock 77 is started, the clock pulses are applied to the clock input of the register 74, and the contents of the register are shifted upwards. The contents of the shift register, and these contents are the code which was generated by the positions of the switches of the decades 61–63, appear, pulse-by-pulse, at the output of the register 74 and are applied through the matching circuit and the switch 12 to the transmission line 19 and the receiver 25. The code receiver is shown in detail in FIG. 4.

The receiver 25 comprises an input terminal 92 which is to be connected to the modem 21 and to the double throw switch 22 which has two stationary contacts 23 and 24. The contact 23 is connected to the stationary contact of the relay 27 which is connected to an output terminal 91 adopted to be connected to the computer 28. The contact 24 is connected to one input of NOR gate 107, whose other input is grounded and whose output is applied to one input of a NOR gate of a latching circuit 109 and to the information input of a shift register 104. The output of the latching circuit 109 is applied to an input of a NAND gate 113 whose output is applied to the enable input of a clock pulse generator 115. The pulse output of the clock 115 is applied to the clock input of the shift register 104. Another input to the latching circuit 109 is connected to ground through a switch 110 which is also connected to the clear input of the register 104. The individual digit outputs from the register 104 are applied individually to separate inputs of a series of exclusive OR gates 99, the other input to the individual gates 99 being connected to the outputs of decade switches 96, 97 and 98. Each of the decade switches 96–98 comprises a group of four double-throw switches such as those shown in decade 98. Each switch can be set to connect the decade output to a line grounded or to a line which carries a positive potential. In the upper position (as shown) of each switch, the decade output line is connected to the grounded line, and in the lower position it is connected to the positive voltage source. The outputs from all of the gates 99 are connected together and through an inverter 101 to the coil 26 of the relay 27. The end position output of the register 104 is connected to the other input of the gate 113. The end position of the register 104 is the last digit position of the register used in this apparatus.

When operating the system, the switch 22 is placed in its code position where it connects with the contact 24. This applies the code coming from the code transmitter 15, through the line 19 and the modem 21 to the input of the gate 107. The gate 107 serves as an impedance matching device to match the output of the modem 21 with the input to the receiver 25. The code from the transmitter 15 is applied through the gate 107 along the line 108 to the information input of the register 104. The information coming from the transmitter 15 also is applied to the latching circuit 109, which operates the same as the similar circuit comprising gates 75 and 76 of FIG. 3, to apply a low input to the gate 113. Since the output from the register 104 is also low, the gate 113 applies a positive pulse to the clock 115 to start the clock operating. As the clock 115 generates its pulses, they are applied to the clock input of the register 104 in synchronism with the incoming code pulses from the transmitter 15. Thus, as the code is applied to the input of the register 104 in series, it is clocked along the register 104 until the register is filled. At this point, the end position output of the register 104 has a positive signal applied to it which is applied to one input to the gate 113. The positive signal causes gate 113 to generate a low output signal, stopping the action of the clock 115. When the register 104 is filled, the information contained in the register is applied by individual digits to the inputs of the series of gates 99. These gates 99 act as a comparator with the other set of inputs being applied from the decade switches 96–98. The decade switches were previously set with the code of the day (or week, or month, or whatever), and this code is applied to the second set of inputs to the gates 99. When the inputs from the decade switches 96–98 and the outputs from the register 104 are the same, then the gates 99 produce high output signals which are applied through the inverter 101 to energize the coil 26 and close the relay 27. This connects the modem 21 with the input to the computer 28. The switch 110 grounds the other input to the latching circuit 109 permitting the circuit to operate, and it also grounds the register 104 permitting it to accept information.

The above specification has described a new and improved system for protecting computers from unauthorized access by way of remote computer terminal. The system includes means for generating two separate codes which must pass two separate coded devices before the computer itself is connected to the terminal. It is realized that the above description may indicate to those skilled in the art additional ways in which the principles of this invention may be used without departing from its spirit. It is, therefore, intended that this invention be limited only by the scope of the appended claims.

What is claimed is:

1. A communications system security apparatus, said apparatus comprising:
    a. a data processor from which information may be entered or removed;
    b. a terminal capable of sending or receiving information from said data processor in a given interval of time;
    c. an information transmission path adapted to carry information between said data processor and said terminal in a given interval of time;
    d. a first manually controllable means for normally conditioning the connection of said data processor to said transmission path and operated to provide a code receiving mode;
    e. a first code means located at said terminal having a first predetermined code combination;
    f. a second manually controllable means for normally connecting said terminal to said transmission line and operated to connect said first code means to said transmission path;
    g. a second code means, located at said terminal, having a second predetermined code combination stored therein and responsive to a selected code combination such that when both said second code combination and said selected code combination are identical said terminal is connected to said transmission path; and
    h. a third code means, located at said data processor, having a third predetermined code combination stored therein and connected to said transmission path in said code receiving mode when said first manually controllable means is operated such that said third code means is responsive to said first predetermined code combination when said second manually controllable means is operated to connect said data processor to said transmission path when both said first and second manually controllable means are returned to normal.

2. The apparatus defined in claim 1 wherein said first manually controllable means is a switch.

3. The apparatus defined in claim 1 wherein said second manually controllable means is a switch.

4. The apparatus defined in claim 1 wherein said first code means is a code transmitter.

5. The apparatus defined in claim 4 wherein said code transmitter comprises:
    a. a group of double throw decade switches, each of said group of switches including a plurality of individual switches;
    b. a shift register having a plurality of digit positions, each of said digit positions being coupled to one of said decade switches;
    c. a clock generator coupled to said shift register;
    d. a manually controlled start switch connected to the load input of said shift register and to the disable input of said clock generator;
    e. a first NOR gate having its output coupled to said clock generator, and one of its inputs coupled to said start switch; and
    f. a second NOR gate having its output coupled to the input of said first NOR gate, and one of its inputs coupled to the input of said clock generator, and its other input coupled to said start switch.

6. The apparatus defined in claim 1 wherein said second code means is a local code unit.

7. The apparatus defined in claim 6 wherein said local code unit comprises a series of trigger circuits connected in series in which an output of one trigger circuit is connected to a conditioning input of the next following trigger circuit, a group of switches having one side connected to a source of energy, and means for connecting the other side of each one of said switches to a trigger input of one of said trigger circuits in a preselected sequence to form said first predetermined code combination.

8. The apparatus defined in claim 1 wherein said third code means is a code receiver.

9. The apparatus defined in claim 8 wherein said code receiver comprises:
    a. a register that stores said third predetermined code combination;
    b. comparator means for comparing the code stored in said code receiver to said first predetermined code combination; and
    c. means responsive to a coincidence of said first and third predetermined code in said comparator to connect said data processor to said transmission path.

10. The apparatus defined in claim 1 wherein said information transmission path is a telephone transmission line.

* * * * *

UNITED STATES PATENT AND TRADEMARK OFFICE
CERTIFICATE OF CORRECTION

PATENT NO. : 3,984,637
DATED : October 5, 1976
INVENTOR(S) : Herman T. Caudill et al It is certified that error appears in the above-identified patent and that said Letters Patent are hereby corrected as shown below:

Column 3, lines 25 and 26, change "botton" to --button--.

Column 5, line 31, change "ground" to --grounded--.

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*